(12) United States Patent
Holling

(10) Patent No.: US 8,584,355 B2
(45) Date of Patent: Nov. 19, 2013

(54) METHOD AND APPARATUS FOR TURNING A ROTOR BLADE BEARING ON WIND TURBINES WITHOUT USING A MOBILE CRANE

(75) Inventor: Jochen Holling, Rheine (DE)

(73) Assignee: Availon GmbH, Rheine (DE)

( * ) Notice: Subject to any disclaimer, the term of this patent is extended or adjusted under 35 U.S.C. 154(b) by 0 days.

(21) Appl. No.: 13/311,363

(22) Filed: Dec. 5, 2011

(65) Prior Publication Data

US 2012/0141280 A1    Jun. 7, 2012

(30) Foreign Application Priority Data

Dec. 3, 2010    (DE) .......................... 10 2010 062 418

(51) Int. Cl.
*F03D 11/00*    (2006.01)

(52) U.S. Cl.
USPC ...................................... 29/889.1; 29/402.03

(58) Field of Classification Search
USPC ................. 29/889.1, 889.21, 889.22, 402.03, 29/402.01, 426.1
See application file for complete search history.

(56) References Cited

U.S. PATENT DOCUMENTS

| | | | |
|---|---|---|---|
| 2010/0254813 A1* | 10/2010 | Dawson et al. | 416/146 R |
| 2011/0142617 A1* | 6/2011 | Mashue et al. | 415/229 |

* cited by examiner

*Primary Examiner* — David Bryant
*Assistant Examiner* — Christopher Besler
(74) *Attorney, Agent, or Firm* — Kilpatrick Townsend & Stockton LLP

(57) ABSTRACT

The invention relates to a method of servicing wind turbines having a hub containing a slewing ring bearing to which a rotor blade is fastened such that the pitch angle is adjustable. The rotor blade is brought into a position pointing vertically downward, lowered by means of threaded rods and hoisting means and attached suspendingly to the hub. The slewing ring bearing is then turned. The rotor blade is then hoisted again and fastened to the slewing ring bearing.

12 Claims, 10 Drawing Sheets

METHOD AND APPARATUS FOR TURNING A ROTOR BLADE BEARING ON WIND TURBINES WITHOUT USING A MOBILE CRANE

CROSS-REFERENCE TO RELATED APPLICATION

This application claims the benefit of priority to German Application No. DE 10 2010 062 418.7, filed Dec. 3, 2010, the disclosure of which is herein incorporated by reference.

BACKGROUND OF THE INVENTION

The invention relates to wind turbines with rotor blade adjustment (also called pitch control or pitch adjustment). Such wind turbines have a rotor blade bearing for their adjustable rotor blade—said bearing also being called a slewing ring bearing. The invention relates in particular to the servicing of such wind turbines.

Wind turbines typically have a rotor with a hub on which a plurality of rotor blades are mounted in most cases. In order to adjust the pitch angle of a respective rotor blade, a blade adjustment means is usually provided. This may comprise a slewing ring whose movable part is connected via a rotary bearing to the hub and is thus rotatable about a longitudinal axis of the blade with respect to the hub. The respective rotor blade is fastened to the movable part and is thus likewise rotatable about its longitudinal axis and adjustable in pitch with respect to the hub.

Such slewing rings of the kind used in wind turbines generally form a unit with the rotary bearing and as a unit generally have an inner and an outer ring, as well as rolling elements, spacers or a cage. The part which is adjusted is the freely rotatable part of the unit, which is referred to in the following as the movable slewing bearing part, and which is joined to the rotor blade. The counterpart is rigidly joined to the hub. Adjustment is normally carried out with the aid of a gearbox-motor combination via toothing on the slewing ring bearing.

In wind turbines with electric blade control, the toothing of the rotor blade bearing, i.e., the toothing of the slewing ring bearing in the range between about 0° and 5° blade pitch angle (blade position), may be subject to increased wear and tear. This is due to blade adjustment in the upper load range of the wind turbine.

In wind turbines with blade pitch control, the used portion of the toothing generally amounts to 90°. The blades are moved within the range between 0° and 90°. The range between 0° and 5° is viewed as the working range. Wear and tear is at its maximum in this range. Within the working range, the lubricant applied is displaced by permanent movement of the drive, thus resulting in greater abrasion of the respective locale. When the wear limit is reached, it is necessary to turn the position of the rotor blade bearing with respect to the rotor blade, so that unworn teeth in the toothing on the slewing ring bearing engage with the drive.

Two methods are currently used for turning the rotor blade bearing. In the first method, the rotor of the wind turbine is dismantled. The blades are dismantled singly using two mobile cranes, the movable slewing bearing part is moved and the rotor blade is remounted. In the second method, the rotor blade is dismantled, while the rotor remains mounted, using two cranes or one crane. In the latter case, a frame is used which keeps the blade in balance. The movable slewing bearing part is moved and the rotor blade is then remounted. In both methods, the movable slewing bearing part is moved into the region which was unused until that time.

An alternative, preferably simpler procedure for servicing wind turbines is desirable.

BRIEF SUMMARY OF THE INVENTION

According to a first aspect, the invention relates to a method of releasing a rotor blade of a wind turbine, wherein the rotor blade is mounted during operation of the wind turbine on a hub of the wind turbine by means of a slewing ring bearing such that the pitch angle is adjustable, and a movable slewing bearing part is joined rotatably to the hub and fixedly to a flange of the rotor blade by a plurality of threaded bolts.

The method comprising the following steps:
positioning the rotor blade in a position pointing at least approximately vertically downward as seen from the hub,
screwing in at least one threaded rod into a tapped hole in the rotor blade flange,
holding the rotor blade, by means of a hoisting means which is joined to at least one threaded rod, in a position in which the rotor blade flange abuts the slewing ring bearing,
releasing all the threaded bolts, and
lowering the rotor blade by means of the hoisting means.

The method according to the first aspect of the invention allows the rotor blade to be disconnected, as the prerequisite for releasing the slewing ring bearing, without the aid of a mobile crane or similar heavy equipment.

The hoisting means is preferably a hydraulic cylinder.

The method can basically be applied to wind turbines which have a horizontal axis of rotation. Such wind turbines usually have a tower, a nacelle mounted on top of the tower and a hub which is mounted on one side of the nacelle. The nacelle usually contains a generator, a brake and a gearbox, where relevant. Rotor blades are attached to the hub, typical wind turbines having two or three rotor blades. However, none of the various aspects of the invention are limited to wind turbines having a specific number of rotor blades. Rather, the invention can essentially be applied to wind turbines having any number of rotor blades.

During operation of a wind turbine to which the method according to the first aspect of the invention can be applied, at least one rotor blade is mounted on the hub of the wind turbine by means of a slewing ring bearing such that the pitch angle is adjustable. The slewing ring bearing typically has an inner ring and an outer ring. It may either be configured in such a way that the outer ring is stationary and the inner ring is rotatable, or such that the inner ring is stationary and the outer ring is rotatable. Depending on whether the outer ring or the inner ring is rotatable, the outer ring or the inner ring, respectively, is referred to as the movable slewing bearing part. Turning the slewing ring bearing means that the movable slewing bearing part is turned relative to the respective other part of the slewing ring bearing and relative to the hub. An electric motor provided with a small gear wheel and which engages with a gear ring on the slewing ring bearing is normally used to turn the slewing ring bearing.

The rotor blade has a rotor blade flange which is used to fasten the blade to the movable slewing bearing part. A plurality of threaded bolts which join the movable slewing bearing part to the rotor blade flange are normally used for this purpose. To that end, the rotor blade flange typically has threaded holes for receiving the threaded bolts.

In the step of positioning the rotor blade in a position pointing at least approximately vertically downward as seen from the hub, the respective rotor blade is brought into a position in which it points with one end remote from the hub in the direction of gravity, that is to say in the direction of the center of the earth, so that substantially no bending forces act on the rotor blade flange.

In the step of screwing in at least one threaded rod, the immediately preceding fastening of the rotor blade already achieved with threaded bolts is extended to include additional fastening by the threaded rod. This means that, before this step, the rotor blade was fastened only by all or some threaded bolts—if special threaded holes for threaded rods are present—, whereas after this step the rotor blade is fastened not only by threaded bolts but also by the threaded rod. Normally, this will not involve any direct movement of the rotor blade. However, this step establishes the basis for removing all the threaded bolts later on.

Each threaded rod is preferably connected in such a way to a respective hoisting means that can exert a holding force on the rotor blade. This is typically achieved by the hoisting means being connected sufficiently fixedly to the threaded rod and itself resting either on the slewing ring bearing or on some other load-bearing part, or being suspended from a suitable load-bearing part inside the hub. By screwing the threaded rod into a tapped hole in the rotor blade flange, a fixed connection is produced between threaded rod and the rotor blade, so that the threaded rod can hold the rotor blade. The threaded rod and the hoisting means are preferably designed in such a way that the threaded rod is able on its own to hold the rotor blade when the hoisting means is appropriately attached.

In the step in which the rotor blade is held, by means of a hoisting means which is joined to at least one threaded rod, in a position in which the rotor blade flange abuts the slewing ring bearing, the pressure in the hydraulic cylinder, as preferred hoisting means, is brought to a level at which the threaded rod exerts an upwardly directed force on the rotor blade, said force being equal to or greater than the gravitational force acting on the respective threaded rod. Hydraulic cylinders normally have a piston and two pressure chambers laterally adjacent to the piston. For the purposes of the present method according to the first aspect of the invention, it basically suffices to control the pressure in one chamber. The chambers typically used for this purpose are those in which an increase in pressure leads to the threaded rod exerting an upwardly directed force on the rotor blade. For example, when the threaded rod is an extension of a piston rod of the hydraulic cylinder, and the hydraulic cylinder abuts the slewing ring bearing with a downwardly pointing piston rod, then the pressure in the lower chamber of the hydraulic cylinder is the one that is typically controlled in order to carry out the method according to the first aspect of the invention. In order to hold the rotor blade in a position in which the rotor blade flange abuts the slewing ring bearing, the pressure in that chamber is then increased. This can be done using a hydraulic pump, for example.

It should be mentioned that it is not imperative to create pressure in the hydraulic cylinder in the manner described in the foregoing. In the step of holding the rotor blade by means of the hydraulic cylinder in a position in which the rotor blade flange abuts the slewing ring bearing, it is equally possible to create a particularly low pressure in one pressure chamber of the hydraulic cylinder if the hydraulic fluid being used has a sufficiently low vapor pressure. The chamber in question should be one for which a reduction in the pressure in the chamber results in an upwardly directed force being exerted on the rotor blade. In the step of lowering the rotor blade, the pressure in this chamber should then be increased accordingly. Alternatively, it is also possible that both pressure chambers of the hydraulic cylinder be controlled in parallel and used to carry out the method.

When the rotor blade is held by means of the hydraulic cylinder in a position in which the rotor blade flange abuts the slewing ring bearing, all the threaded bolts joining the rotor blade flange and the movable slewing bearing parts are unscrewed. Despite all the threaded bolts being unscrewed, the rotor blade does not move because it is held in its position by means of the hydraulic cylinder. Thus, the threaded rod and the hydraulic cylinder now perform the function of the threaded bolts before they were unscrewed.

The step of lowering the rotor blade by means of the hydraulic cylinder is typically initiated by lowering the pressure in a pressure chamber of the hydraulic cylinder, that was increased in the step of holding the rotor blade. The pressure is suitably lowered thereby in such a way that the force exerted by the threaded rod on the rotor blade can no longer fully compensate the gravitational force acting on the rotor blade. This causes the rotor blade to move downward.

In one embodiment of the method according to the first aspect of the invention, a threaded bolt screwed into the tapped hole is unscrewed and removed before the threaded rod is screwed in. This variant of the method is applied whenever the threaded rod is to be screwed into a tapped hole in the rotor blade flange, into which a threaded bolt was previously screwed in in order to join the rotor blade flange to the movable slewing bearing part. However, this is not imperative. Alternatively, the threaded rod may be screwed, for example, into a bore in the rotor blade flange, which is specially provided for this purpose, or which is not provided with a threaded bolt when the wind turbine is in operation, for example because the necessary strength of the join between the rotor blade and the slewing ring bearing is achieved even without a threaded bolt in this bore.

It is preferred that at least two threaded rods which are each connected to a respective hoisting means are each screwed into a respective tapped hole in the rotor blade flange. This improves the fastening of the rotor blade to the slewing ring bearing, and the rotor blade is then fastened, more particularly, to a further attachment point, thus limiting its freedom of movement. It is further preferred that three threaded rods which are each connected to a respective hoisting means be screwed into a respective tapped hole in the rotor blade flange. A plane of the rotor blade flange can thus be clearly defined such that the rotor blade flange and hence also the rotor blade no longer have any freedom of movement. By reducing the freedom of movement of the rotor blade, it is possible to prevent an excessive bending force being exerted on the individual threaded rods and the hoisting means, for example when wind leads to a bending force being exerted on the rotor blade flange, which might lead in turn to the threaded rod breaking and in the worst case to the rotor blade falling down. For this reason, it is particularly preferred that either three or four threaded rods are used, each being connected to a respective hydraulic cylinder. Any other number of threaded rods may also be used, however.

Even when several threaded rods each connected to a respective hoisting means are used, it is preferred that each of the threaded rods and the associated hoisting means are designed to hold the rotor blade on their own as well. If material failure occurs in one of the threaded rods, for example, the rotor blade can still be held by the other threaded rods.

The method according to the first aspect of the invention can be developed, beyond the releasing of the rotor blade, in such a way that the rotor blade is not only suspended from one or more threaded rods, but is also fastened to the hub by an additional fastening component. Two embodiments of this shall now be described, namely fastening by means of at least one adapter and fastening by means of at least one cable.

According to one variant, at least one adapter for holding the rotor blade is attached to the hub and to the rotor blade after the rotor blade has been lowered. A suitable adapter is described below, for example, in connection with the third aspect of the invention. The adapter should be attached not only to the rotor blade but also to the hub in such a way that it is able to hold the rotor blade. This can be done in a variety of ways, for example by bolting, suspension, insertion, etc.

It is preferred that a plurality of adapters be used. By using two adapters, it is possible to limit the freedom of movement of the rotor blade to a state in which the rotor blade is held by the adapters only. Using three or more adapters makes it possible for the rotor blade to have no degrees of motion any longer in a state, in which it is held by the adapters only. The advantages to be achieved in this way are identical to those that can be achieved by using a plurality of threaded rods.

Alternatively, an adapter may also have a plurality of attachment points. Such an adapter can be joined to the rotor blade flange at several points, for example with several threaded bolts, and/or it can be joined to the hub, for example with several threaded bolts.

When using several adapters, and in particular when using just one adapter, the adapters should preferably be designed in such a way that a single adapter is able to hold the rotor blade on its own. This increases safety.

In one embodiment, for example when one adapter according to the third aspect of the invention is used, the adapter is fastened with one threaded bolt to the hub and to the rotor blade flange, respectively. The adapter is used to compensate the different bolt circle diameters of the rotor blade flange and the hub flange. In other words, the adapter serves as a bolt circle adapter. Alternatively, the adapter may also be fastened by a threaded bolt to the rotor blade only, or to the hub only, the adapter then being fastened differently to the respective other element.

The adapter is typically attached by industrial climbers. Alternatively, however, it is also conceivable that an adapter be attached with the aid of a cable winch, a robot or some other device.

One alternative to using an adapter is to use least one cable. In this case, the at least one cable for holding the rotor blade is fastened to the hub and to the rotor blade after the rotor blade has been lowered. A single cable may be used for that purpose, or several cables may be used—for example two, three or four cables. When using several cables, and in particular when using just one cable, the cables should preferably be designed in such a way that a single cable is able to hold the rotor blade on its own.

The cable can be attached to the hub and to the rotor blade in different respective ways. For example, the cable can be pulled through an eyelet, or it can be provided with a screw-in end piece and screwed into a tapped hole, or it can be guided around a rod or similar element provided for that purpose.

When one cable is used, it is further preferred that at least one guide rail be mounted on the hub and on the rotor blade in order to stop the rotor blade from swinging. It is preferred that at least two and more preferably at least three guide rails are used. The guide rails do not need to be designed to hold the rotor blade on their own. Instead, they ensure stabilization of the rotor blade, which in certain circumstances may otherwise not be held stably enough by one or more cables.

The method according to the first aspect of the invention, and which is extended by the feature of holding the rotor blade on a further element, for example on an adapter or on a cable, may be further developed to include attaching the rotor blade suspendingly to the hub. This is done by unscrewing all the screwed-in threaded rods (300, 310, 320) after attaching the at least one adapter or the at least one cable, or after attaching a plurality of adapters or a plurality of cables. In this way, the rotor blade is held at the hub only by the at least one adapter or by the at least one cable. In this state, the rotor blade is suspendingly attached to the hub.

What is advantageous about developing the method such that the rotor blade is suspendingly attached to the hub is that the movable slewing bearing part can be turned independently of the rotor blade when the method has been completed. This is possible because there is no longer a fixed connection between the movable slewing bearing part and the rotor blade.

According to a second aspect, the invention relates to a method of servicing a wind turbine, in which at least one rotor blade is mounted during operation of the wind turbine on a hub of the wind turbine by means of a slewing ring bearing such that the pitch angle is adjustable, and a movable slewing bearing part is joined rotatably to the hub and fixedly to a flange of the rotor blade by a plurality of threaded bolts. This method comprises the following steps:

attaching the rotor blade suspendingly to the hub,
turning the movable slewing bearing part in relation to the rotor blade flange,
fastening the rotor blade to the slewing ring bearing.

The method according to the second aspect of the invention allows the slewing ring bearing to be turned, without a mobile crane or similar heavy equipment being needed.

The observations above concerning a wind turbine in which the method according to the first aspect of the invention can be applied are likewise true for a wind turbine in which the method according to the second aspect of the invention can be applied.

When the rotor blade is suspendingly attached to the hub, the rotor blade which is normally attached to the movable slewing bearing part is released from the slewing ring bearing and suspended elsewhere from the hub. This allows the movable slewing bearing part to turn freely. In one preferred embodiment of the method according to the second aspect of the invention, the rotor blade is suspendingly attached by means of a method according to the first aspect of the invention, which is extended for suspended attachment of a rotor blade.

In the step of turning the movable slewing bearing part with respect to the rotor blade flange, the slewing ring bearing is preferably turned at least to such an extent that, after the slewing ring bearing has been turned, a gear wheel of a drive motor which ensures that the angle is adjustable engages in the working range at a point that has been little used so far and more particularly which has not been worn down. It is preferred that the slewing ring bearing be turned by at least 10°, particularly preferably by at least 15°, or especially preferably be turned by at least 100°. At the very least, the slewing ring bearing should not be turned by 0°, 360° or by any integer multiple of the latter. Similarly, the slewing ring bearing should not be turned to a position in which the gear wheel of the drive motor would engage in the working range with a point on the gear ring that is already worn.

The step of turning the movable slewing bearing part with respect to the rotor blade flange can be carried out in such a way that the movable slewing bearing part is turned with respect to the hub, whereas the rotor blade flange is not turned. Alternatively, however, it may also be carried out in such a way that the rotor blade flange is turned, whereas the movable slewing bearing part is not turned. This is possible, for example, when the rotor blade is attached suspendingly on cables. A combination of the two variants is also possible.

The step of fastening the rotor blade preferably includes the following steps:
- screwing at least one threaded rod which is connected to a hydraulic cylinder into a tapped hole in the rotor blade flange,
- removing adapters, cables or guide rails so that the rotor blade is only held by one or more threaded rods,
- hoisting the rotor blade by means of the at least one hydraulic cylinder,
- fastening the rotor blade to the slewing bearing part by screwing in a plurality of threaded bolts.

In this way, the method of releasing a rotor blade according to the first aspect of the invention is essentially reversed.

By the step of screwing in at least one threaded rod which is connected to a hoisting means, a fixed connection is established between the threaded rod and the rotor blade. A plurality of threaded rods are preferably used for this purpose, for example two threaded rods. What is particularly preferred are three or four threaded rods. This means that the rotor blade can be held on the threaded rods, as a result of which it is possible to remove the adapters, the cables or the guide rails without the rotor blade falling down.

In the step of removing the adapters, the cables or the guide rails, the direct connection which is established between the rotor blade and the hub by the adapters, the cables or the guide rails is eliminated. This means that, from then on, the rotor blade is suspended from one or several threaded rods only. This also allows the rotor blade to be subsequently hoisted by means of the at least one hoisting means.

In order to hoist the rotor blade by means of the at least one hoisting means in the form of a hydraulic cylinder, a pressure in a pressure chamber of the hydraulic cylinder is normally increased so that the threaded rod exerts an upwardly directed force on the rotor blade that is greater than the component of the gravity of the rotor blade that acts on the respective threaded rod. The rotor blade is thus hoisted and returned to the position in which the rotor blade flange abuts the slewing ring bearing.

By the step of fastening the rotor blade to the slewing ring bearing by screwing in a plurality of threaded bolts, a fixed connection is again established between the rotor blade and the slewing ring bearing. In this way, the rotor blade can be used again to drive the wind turbine. It is preferred in this regard that the rotor blade flange be bolted onto the movable slewing bearing part.

After the step of fastening the rotor blade to the slewing ring bearing, a further step is preferably carried out in which the threaded rods are removed. The threaded rods can be used, for example, to carry out the inventive method on a different rotor blade.

According to a third aspect, the invention relates to an adapter for attaching a rotor blade suspendingly to a wind turbine hub,
- said adapter having a flat top side and a flat underside parallel thereto,
- wherein through holes pass through both the top side and the underside.

The through holes are accessible from a space between the top side and the underside, such that a threaded bolt can be inserted into each of the respective through holes and screwed into an adjacent tapped hole.

The respective through hole in the underside is offset from the corresponding through hole in the top side.

The adapter according to the third aspect of the invention is suitable, in particular, for carrying out a method according to the first aspect of the invention which is developed by the step of attaching an adapter.

With the aid of the adapter, the rotor blade can be suspended from the hub. The adapter can be mounted by industrial climbers, for example. This is substantially more simple than using a mobile crane or similar heavy equipment.

The adapter preferably consists of a metal such as aluminum or steel. Depending on the specific material, the mass of the latter is typically about 20 to 40 kilograms in order to reach the necessary load-bearing capacity. This permits such an adapter to be brought to the workspace at hub height by means of an electrical cable winch inside the tower, or with a hub crane. This, too, avoids having to use a mobile crane or similar heavy equipment.

The adapter may be configured in various different ways. A typical function of the adapter is to bridge the different bolt circle diameters of the hub flange to which the fixed part of the slewing ring bearing is fastened, and of the rotor blade flange which in operation is connected to the movable part of the slewing ring bearing. The through holes should also be large enough for sufficiently thick bolts to be inserted through them to hold the rotor blade on the hub. However, the through holes should not only be accessible for inserting the threaded bolts through them, but also sufficiently accessible to allow a fitter to screw in the threaded bolt. This is typically achieved by the head of an inserted bolt being accessible on at least one side and from a large enough angle that a spanner can be applied and moved.

When the adapter has been attached, the top side typically abuts the slewing ring bearing and thus usually abuts the hub flange as well. The underside parallel thereto typically abuts the rotor blade flange. The offset arrangement of the through hole allows a difference between the bolt circle diameter of the hub flange and the bolt circle diameter of the rotor blade flange to be compensated.

The adapter according to the third aspect of the invention is preferably designed in such a way that it able to hold the rotor blade on its own. If several adapters are then used, safety is increased as a result because even in the event of an adapter failing, for example due to material failure or breakage, a single other adapter would suffice to prevent the rotor blade from falling down.

According to a fourth aspect, the invention relates to the use of an adapter according to the third aspect of the invention in a method according to the first aspect of the invention, which is extended by the step of inserting an adapter. An adapter according to the third aspect of the invention can be used particularly advantageously in a method according to the first aspect of the invention, in which the adapter is fastened to the hub and to the rotor blade flange with one threaded bolt, respectively.

The advantages of an adapter used in a method according to the invention, as described in the foregoing in connection with a method according to the first aspect, the method according to the second aspect and the connecting element according to the third aspect of the invention, also hold true for the use of an adapter according to the fourth aspect of the invention.

Further advantages and features of the invention will become evident from the following embodiments, which are described with reference to the attached drawings.

DETAILED DESCRIPTION OF THE INVENTION

Figure 1:
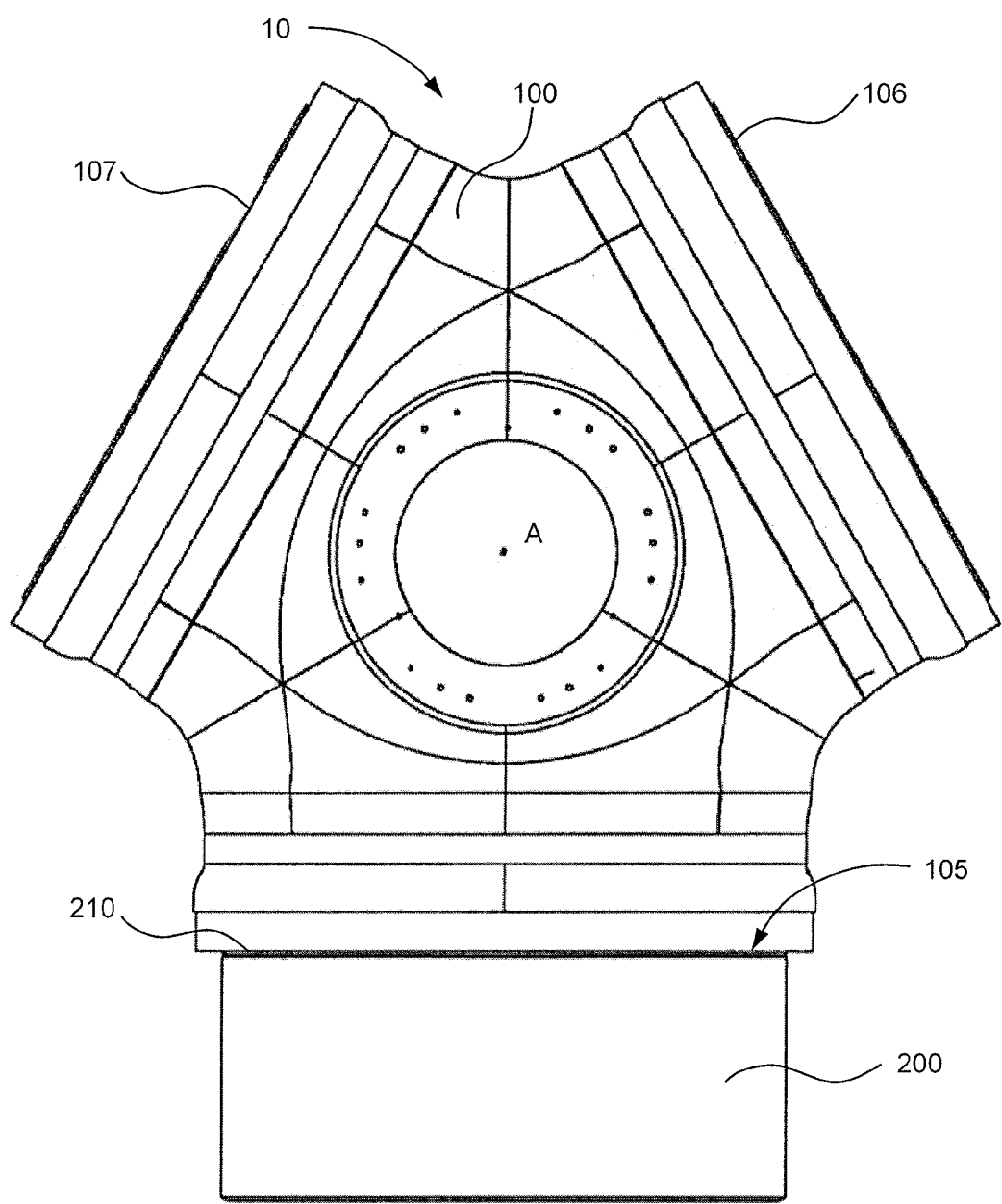
FIG. 1 shows a rotor blade arrangement comprising a hub and a rotor blade in the fully assembled state.

FIG. 1 shows a rotor blade arrangement 10 comprising a hub 100 and a rotor blade 200. Hub 100 is rotatable about an axis A.

Hub 100 has a hub flange 105 on which rotor blade 200 is mounted by means of a rotor blade flange 210. Hub 100 also has two other hub flanges 106, 107 to which other blades can be fastened. The invention shall now be described with reference to hub flange 105 only.

Figure 2A:
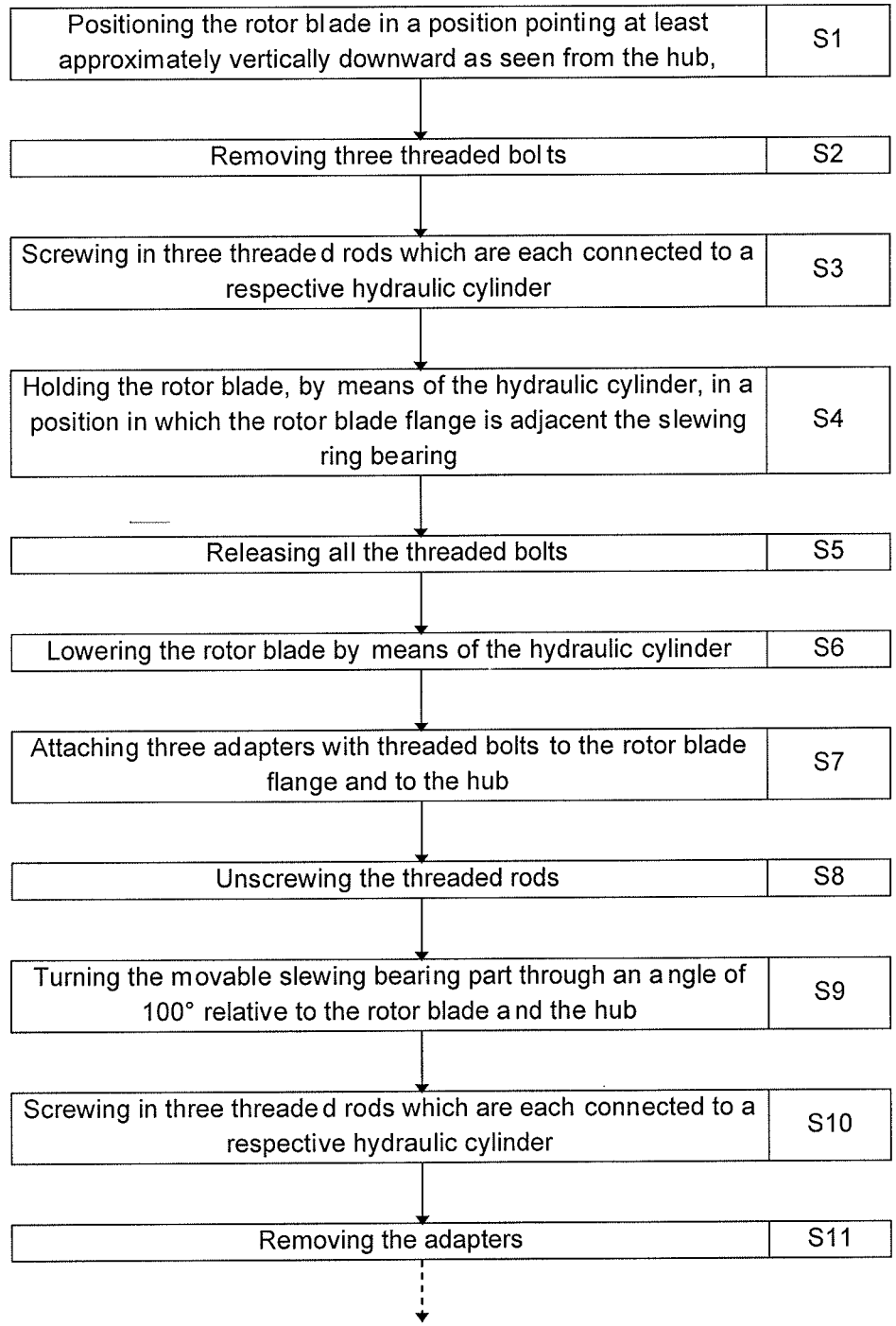
FIGS. 2A and 2B show a method according to the present invention for servicing a wind turbine.
Figure 2B:
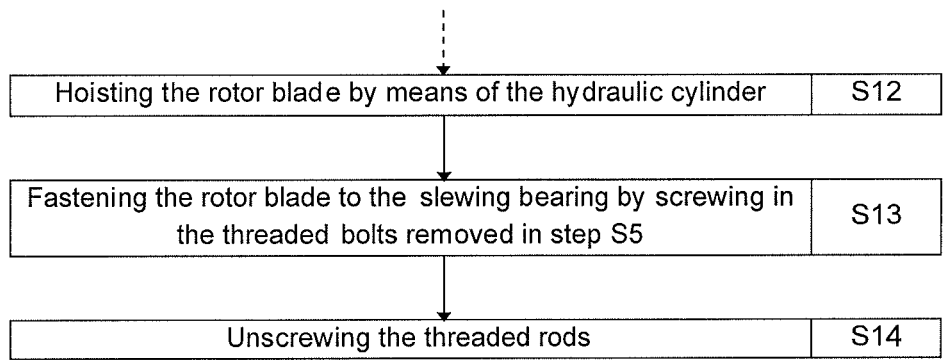

FIGS. 2A and 2B show an embodiment of the inventive method for servicing a wind turbine. FIGS. 2A and 2B simultaneously show embodiments of the inventive method of releasing a rotor blade, and developments of that method.

In step S1, a rotor blade on which maintenance or servicing work is to be carried out is brought into a position in which it points at least approximately vertically downward, as seen from the hub. This is done by turning the hub accordingly and applying a brake which is normally present in the wind turbine.

In step S2, three threaded bolts by which the rotor blade is fastened to the hub are removed. This is done by turning the threaded bolts in a direction in which the respective threaded bolt is unscrewed. As a result, threaded holes in the rotor blade flange become free, into which threaded rods can subsequently be screwed.

In step S3, three threaded rods which are each connected to a respective hydraulic cylinder as hoisting means are screwed into the tapped holes that were cleared in step S2. This is done by turning the threaded rod accordingly. The hydraulic cylinders are laid on top of the rotor blade flange so that they can be supported on the rotor blade flange.

In step S4, the rotor blade is held by means of the hydraulic cylinder in a position in which the rotor blade flange abuts the slewing ring bearing. To this end, lower pressure chambers of the hydraulic cylinders are sufficiently pressurized, by attaching and operating a hydraulic pump, that a total, upwardly directed resultant force exerted on the rotor blade by the hydraulic rods is at least as large as the gravitational force acting on the rotor blade.

In step S5, all the threaded bolts are then released. Thus, once step S5 has been carried out, the rotor blade is held on the hub only by the threaded rods.

In step S6, the rotor blade is then lowered by means of the hydraulic cylinder. This is done by reducing the pressure in the lower chambers of the hydraulic cylinders. The pressure is reduced to such an extent that the total, upwardly directed resultant force exerted on the rotor blade by the threaded rod is less than the gravity of the rotor blade. The rotor blade thus moves in a downward direction. This continues until a limit has been reached. The rotor blade has thus been lowered and released from the hub flange.

In step S7, three adapters are subsequently fastened to the rotor blade flange and to the hub by means of threaded bolts, each adapter being fastened to the rotor blade flange by one threaded bolt and to the hub by another threaded bolt. This means that the rotor blade is no longer being held at the hub by just the three threaded rods, but additionally by the three adapters.

In step S8, the three threaded rod are unscrewed. The rotor blade is thus being held at the hub by the adapters only. In this state, the rotor blade is attached suspendingly to the hub. A movable slewing bearing part in the hub is now no longer connected to the rotor blade and can be freely rotated.

After that, in step S9, the movable slewing bearing part is turned through an angle of 100° with respect to the rotor blade and the hub. As a result, a gear wheel of a motor gearbox combination, which is used for adjusting the blade pitch, and which engages in the usual working range of the rotor blade of about 0° to 5° with a point that is not yet worn.

In step S10, the three threaded rods which are each connected to a respective hydraulic cylinder, and which were screwed in in step S3 and unscrewed again in step S8, are then screwed back into the bores of the rotor blade flange. The hydraulic cylinders are then laid on top on the hub flange again so that they can be supported on them. The rotor blade is no longer being held at the hub by just the adapters, but additionally by the threaded rods.

The adapters are then removed in step S11. This is done by unscrewing the respective threaded bolts with which the adapters are fastened to the hub and to the rotor blade. After step S11 has been carried out, the rotor blade is suspended from the threaded rods alone.

In step S12, the rotor blade is then hoisted by means of the hydraulic cylinders. This is done by increasing the pressure in the lower pressure chambers of the hydraulic cylinders to such an extent that the threaded rods exert an upwardly directed force on the rotor blade, which is greater than the force of gravity acting on the rotor blade. The rotor blade moves upwards as a result, until it abuts the hub flange.

When the rotor blade flange again abuts the hub flange, the threaded bolts which were removed in step S5 are screwed back into bores in the rotor blade flange in step S13. The rotor blade is thus fastened to the hub again by means of the threaded bolts.

In step S14, the threaded rods which are no longer needed now for holding the rotor blade are unscrewed. Threaded bolts are also screwed subsequently into the bores into which the threaded rods were screwed.

Steps S1 to S6 in FIG. 2A represent an embodiment of the method of releasing a rotor blade according to the first aspect of the invention. Steps S1 to S7 represent an embodiment of the method according to the first aspect of the invention, which is extended by attaching adapters. Steps S1 to S8 represent an embodiment of the method according to the first aspect of the invention which is extended in such a way that the rotor blade is suspendingly attached.

When the method shown in FIGS. 2A and 2B is carried out using two adapters according to the third aspect of the invention, the result is an embodiment of a use according to the fourth aspect of the invention.

The various states after individual steps have been carried out shall now be described in further detail with reference to FIGS. 3 to 8. Any deviations between the views shown in the Figures and the steps shown in FIGS. 2A and 2B will be addressed thereby.

Figure 3:
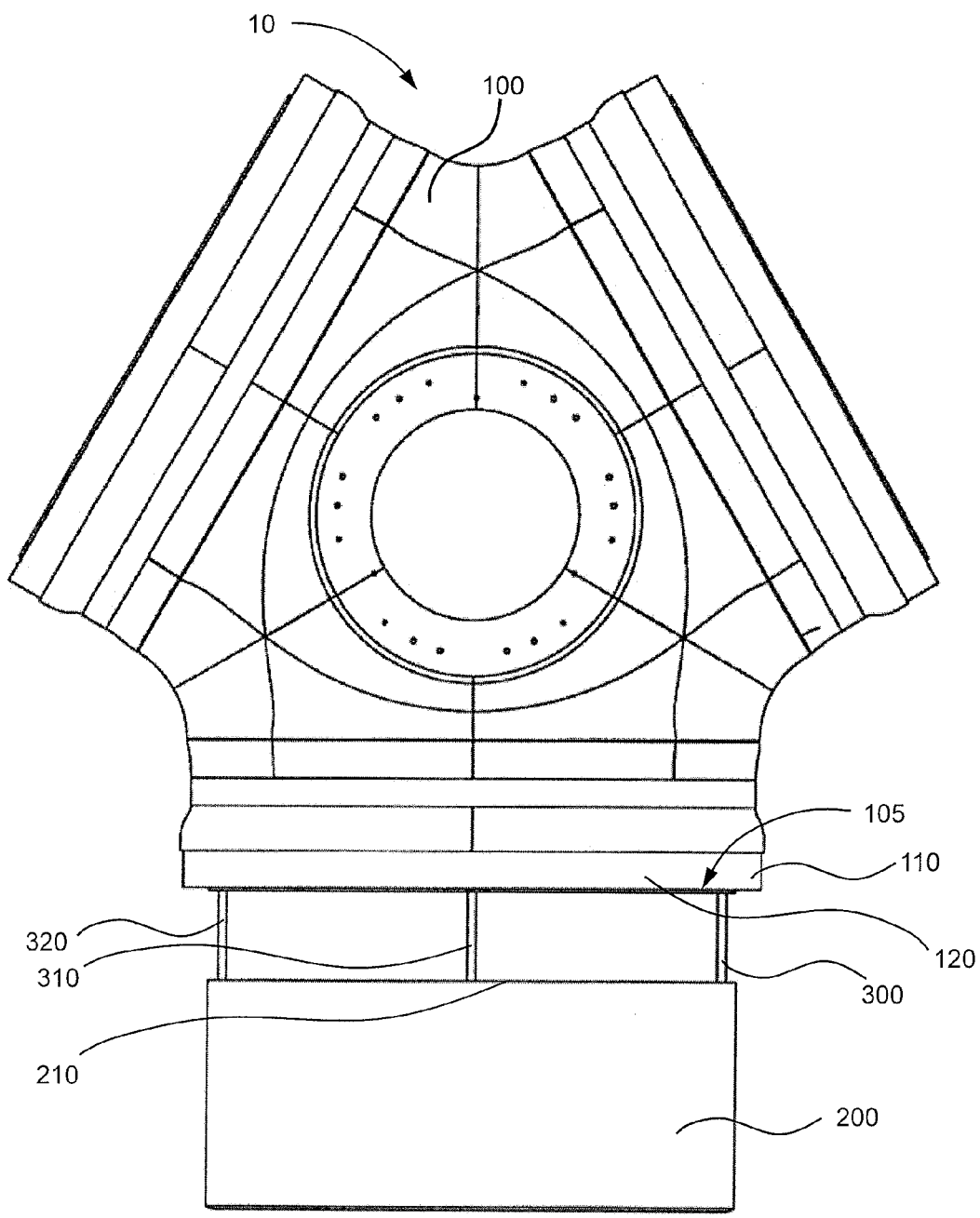
FIG. 3 shows a rotor blade arrangement with a released rotor blade.

FIG. 3 shows rotor blade arrangement 10 of FIG. 1 with a lowered rotor blade and hence a state that exists after step S6. Rotor blade 200 is spaced apart from hub 100 and is held by three threaded rods. Threaded rods 300, 310, 320 extend downwards from an inner ring 120 of hub flange 105. Inner ring 120 is encircled by an outer ring 110. Outer ring 110 is fixed with respect to the hub, whereas inner ring 120 is rotatable with respect to the hub. Inner ring 120 thus forms a movable slewing bearing part. Taken together, outer ring 110 and inner ring 120 form a slewing ring bearing.

The state shown in FIG. 3 is the one that exists after the method of releasing a rotor blade has been carried out according to the first aspect of the invention.

Figure 4:
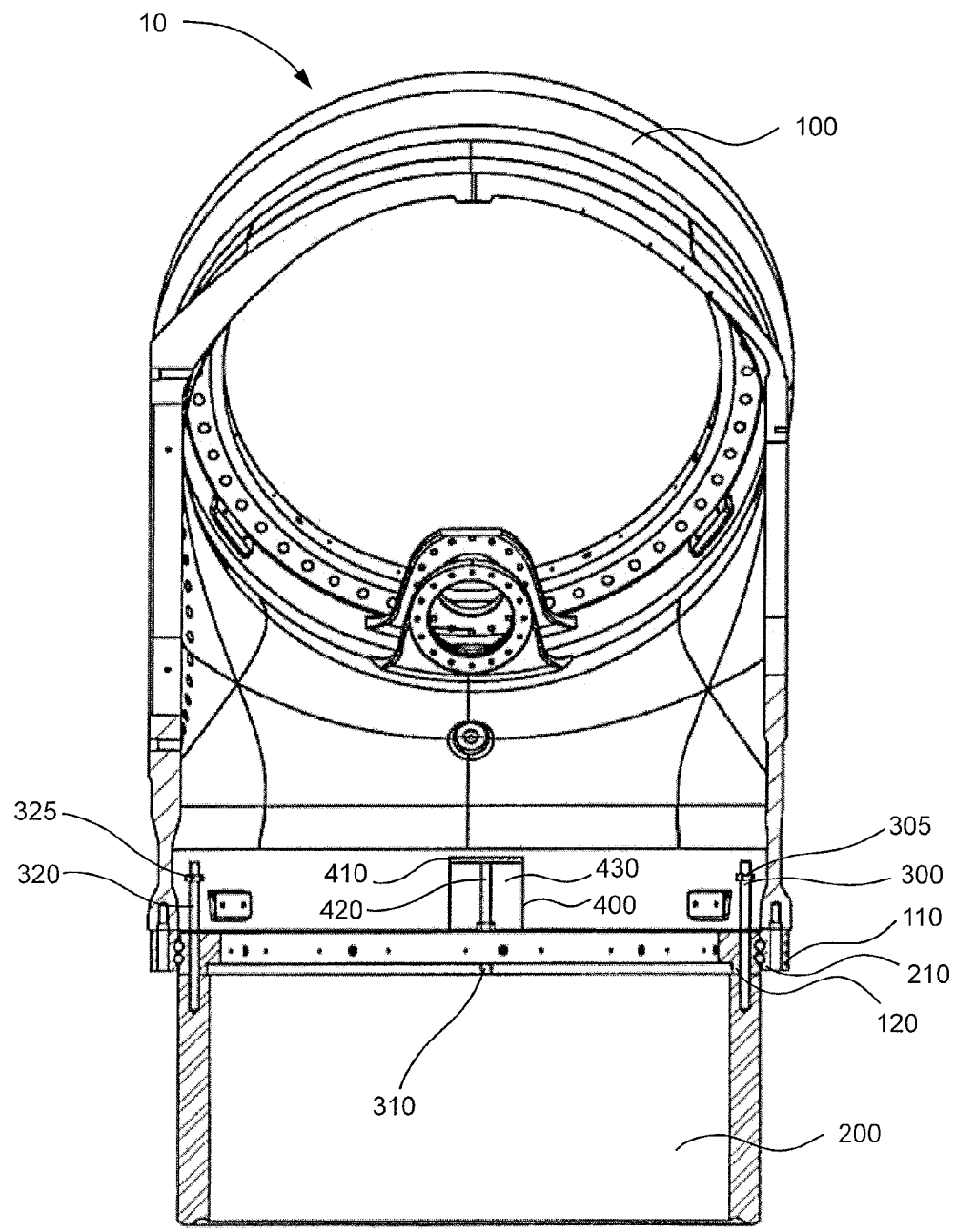
FIG. 4 shows a rotor blade arrangement with a mounted threaded rod and a hydraulic cylinder, in which the rotor blade has not yet been lowered.

FIG. 4 shows rotor blade arrangement 10 in a cross-sectional view, with mounted threaded rods before the rotor blade is lowered. FIG. 4 thus shows the state which exists after step S3.

Threaded rods 300, 310, 320 have been screwed into rotor blade flange 210. However, unlike the embodiment described in FIGS. 2A and 2B, only threaded rod 310 is connected to a hydraulic cylinder 400. At their respective ends which are remote from the rotor blade, the other two threaded rods 300, 320 each have a nut 305, 325 which limits the downward motion of the threaded rods.

Hydraulic cylinders 400 have a piston 410 with a piston rod 420. Threaded rod 310 is embodied as a direct extension of piston rod 420.

Piston 400 also has a pressure chamber 430 which is disposed below piston 410. By pressurizing pressure chamber 430, an upwardly directed force is exerted on piston 410. The upwardly directed force can be transmitted via threaded rod 310 to rotor blade 200. A step which involves holding the rotor blade by means of the hydraulic cylinder in a position in which the rotor blade flange is adjacent the slewing ring bearing (compare step S4 in FIG. 2A) can therefore be carried out by increasing the pressure in pressure chamber 430 with the aid of a pump at least to the extent that the upwardly directed force exerted by threaded rod 310 on rotor blade 200 compensates the gravitational force acting on rotor blade 200.

Figure 5:
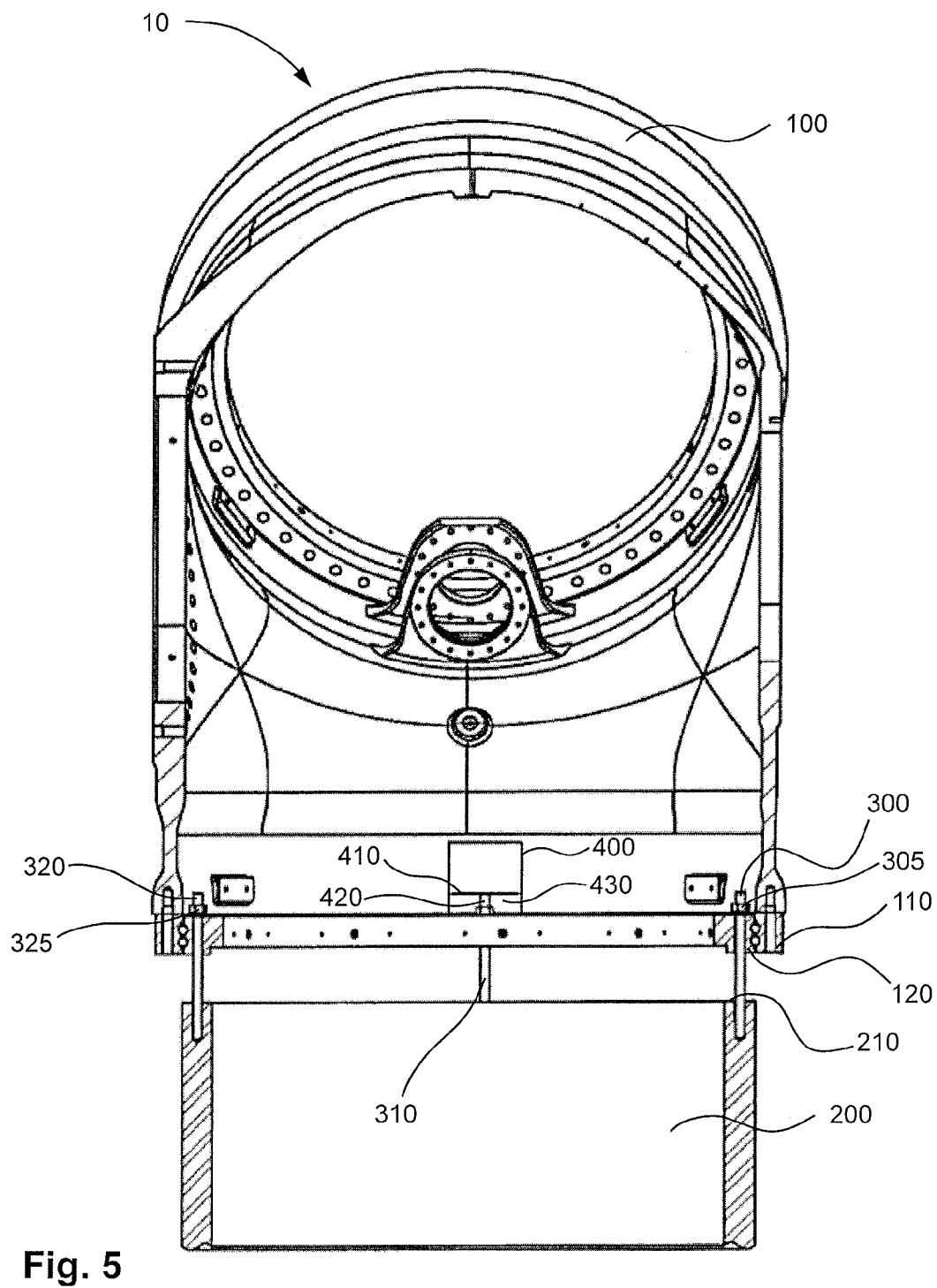
FIG. 5 shows the rotor blade arrangement of FIG. 4, in which the rotor blade has been lowered.

FIG. 5 shows the rotor blade arrangement 10 of FIG. 4, likewise in cross-sectional view, but with rotor blade 200 lowered. FIG. 5 thus shows a state which exists after step S6 in FIGS. 2A and 2B, although the deviation described with regard to FIG. 4 must be taken into account.

Piston 410 is now in a lower position. Nuts 305, 325 are likewise in their lower position, in which they rest upon the movable slewing bearing part 120. Nuts 305, 325 are intended to provide additional retention of the rotor blade in the lower position, as a result of which the load on piston 410 is reduced.

Figure 6:
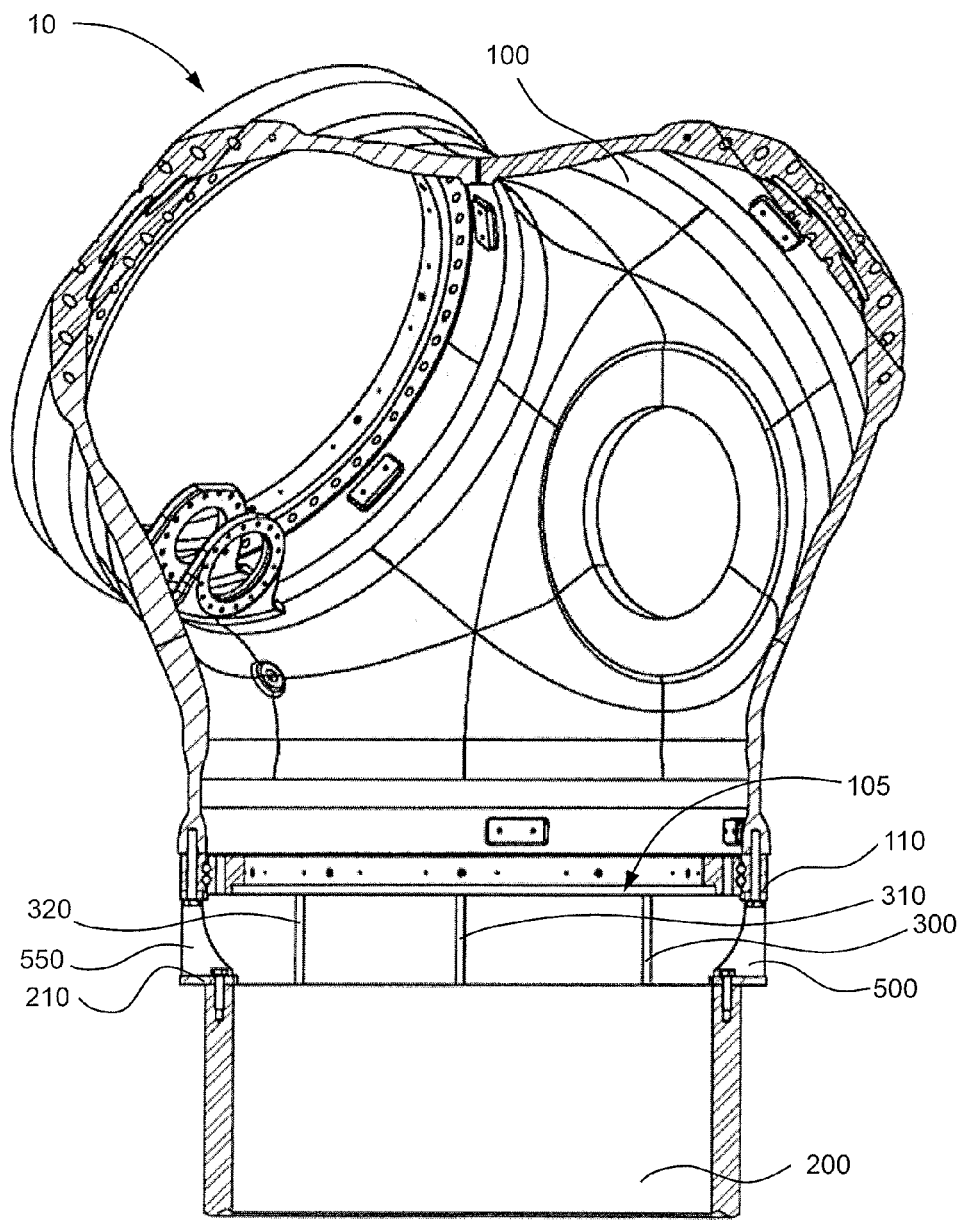
FIG. 6 shows the rotor blade arrangement of FIG. 5, with mounted adapters.

FIG. 6 shows the rotor blade arrangement 10 of FIG. 5, wherein two adapters 500, 550 have additionally been attached. The state shown in FIG. 6 is therefore the same as the one after carrying out step S7 in FIG. 2A, although it should be noted that only two adapters 500, 550 are shown in FIG. 6, whereas FIGS. 2A and 2B describe an example with three adapters.

The two adapters 500, 550 are connected to both the outer ring 110 of hub flange 105 and to rotor blade flange 210. They thus hold rotor blade 200 securely at hub 100 and thus allow threaded rods 300, 310, 320 to be subsequently removed, without the rotor blade falling down.

Figure 7:
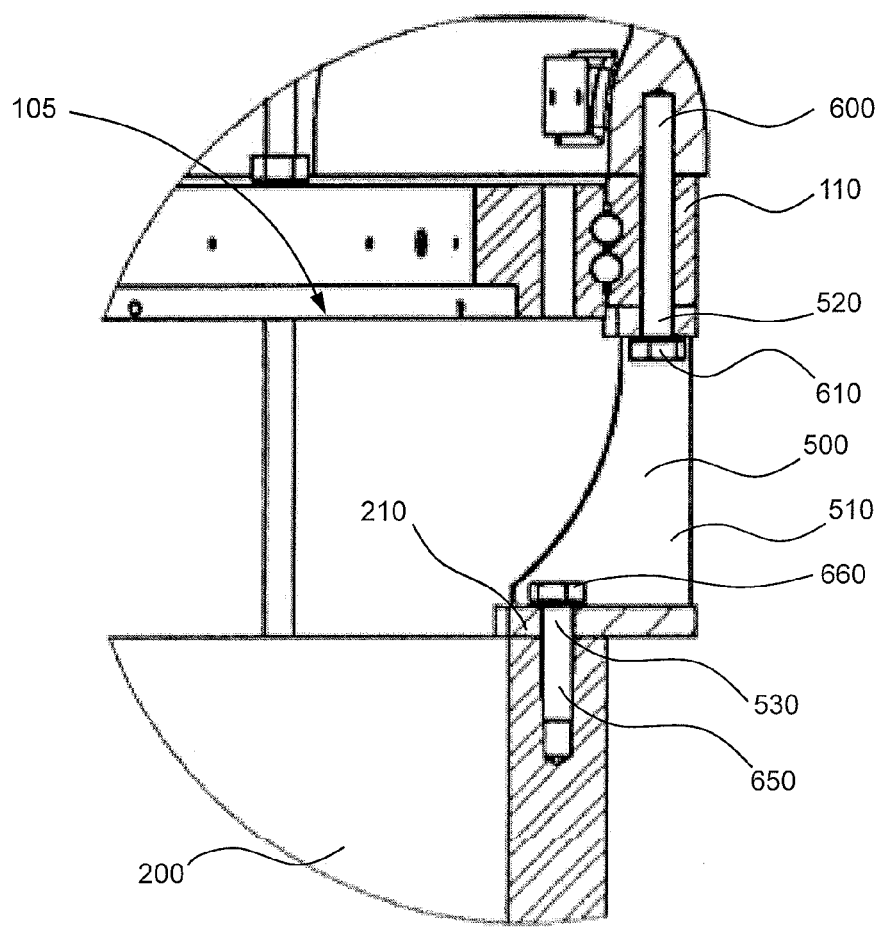
FIG. 7 shows a mounted adapter in greater detail.

Attaching the rotor blade with the aid of adapter 500 is shown in more detail in FIG. 7, which thus shows an embodiment of the adapter according to the third aspect of the invention.

Adapter 500 has a main body 510 which has two through holes 520, 530. Through holes 520, 530 are arranged offset from each other in opposite planar surfaces running parallel to each other.

Adapter 500 is fastened to the outer ring of hub flange 105 by a threaded bolt 600 having a bolt head 610 and extending through through hole 520. Adapter 500 is also fastened to rotor blade flange 210 by a threaded bolt 650 having a bolt head 660 and extending through through hole 530. Bolt heads 610, 660 of threaded bolts 600, 650 are used for screwing in and unscrewing threaded bolts 600, 650.

Figure 8:
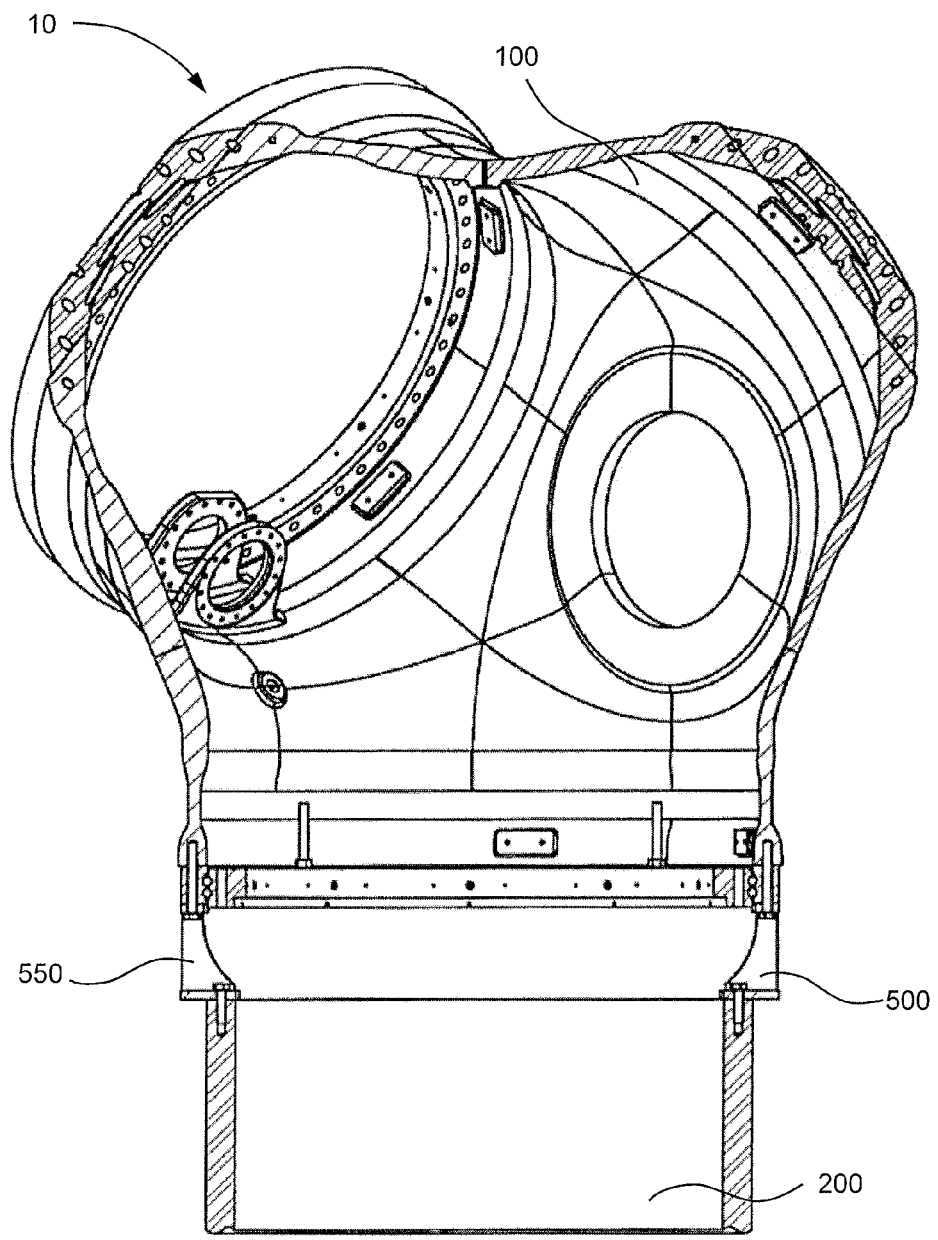
FIG. 8 shows the rotor blade arrangement of FIG. 6, with threaded rods removed.

FIG. 8 shows the rotor blade arrangement 10 of FIG. 6, but with the three threaded rods 300, 310, 320 removed. Adapters 500, 550 now hold rotor blade 200 on their own. The rotor blade is thus attached suspendingly to the hub. The state shown in this Figure is the same as the one that exists after S8 in FIGS. 2A and 2B, but with the aforementioned difference that only two adapters are shown in FIGS. 6 and 8.

Figure 9:
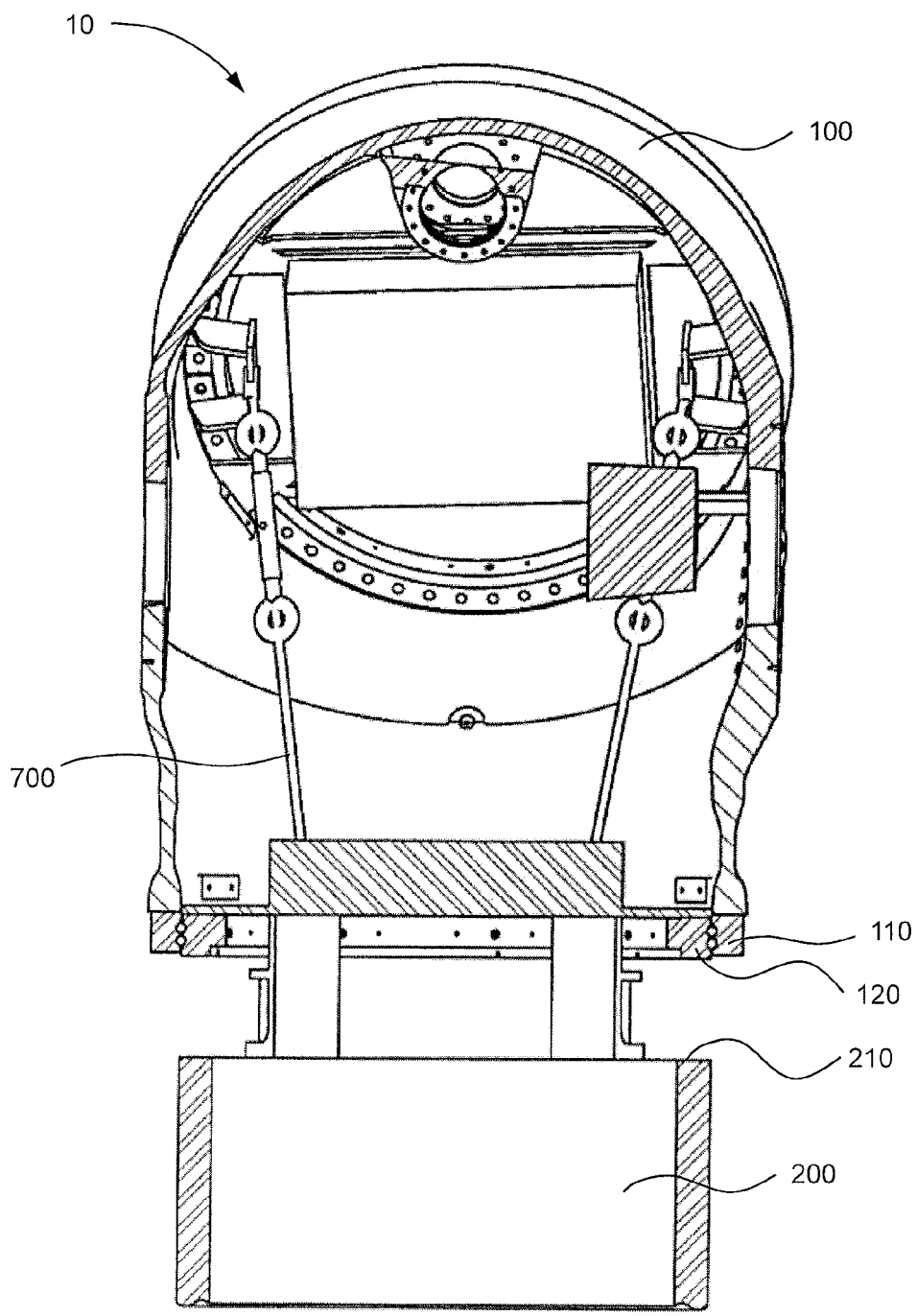
FIG. 9 shows a rotor blade arrangement with a rotor blade which is attached to cables.

FIG. 9 shows an alternative suspended attachment of rotor blade 200 to hub 100. Instead of adapters 500, 550 shown in FIGS. 6 and 8, cables 700 are now used. These are suspended inside hub 100 and connected to rotor blade 200. The rotor blade can thus be attached suspendingly to the cables without threaded rods being needed. This configuration likewise allows the movable slewing bearing part 120 to turn relative to hub 100, i.e., relative to the outer slewing bearing part 110 and also relative to rotor blade flange 210. The cables have the specific advantage, in contrast to the adapters, that they can be attached from inside the hub, which only requires work that can be carried out inside the hub. This thus obviates the need to deploy industrial climbers.

LIST OF REFERENCE SIGNS

A Axis
10 rotor blade arrangement
100 Hub
105 Hub flange
106 Hub flange
107 Hub flange
110 Outer ring
120 Inner ring, movable slewing bearing part
200 Rotor blade
210 Rotor blade flange
300 Threaded rod
305 Nut
310 Threaded rod
320 Threaded rod
325 Nut
400 Hydraulic cylinder
410 Piston
420 Piston rod
430 Pressure chamber
500 Adapter
510 Main body
520 Through hole
530 Through hole
550 Adapter
600 Treaded bolt
610 Bolt head
650 Treaded bolt
660 Bolt head
700 Cables

What is claimed is:

1. A method of releasing a rotor blade (200) of a wind turbine, wherein the rotor blade (200) is mounted during operation of the wind turbine on a hub (100) of the wind turbine by means of a slewing ring bearing (110) such that a pitch angle of the turbine blade is adjustable, and a movable slewing bearing part (120) is joined rotatably to the hub (100) and fixedly to a flange (210) of the rotor blade (200) by a plurality of threaded bolts, said method comprising the following steps:

- positioning the rotor blade (200) in a position pointing at least approximately vertically downward as seen from the hub (100),
- screwing in at least one threaded rod (300, 310, 320) into a tapped hole in the rotor blade flange (210),
- holding the rotor blade, by means of a hoisting means (400) which is connected to the at least one threaded rod, in a position in which the rotor blade flange (210) abuts the slewing ring bearing (110, 120),
- releasing all of the threaded bolts,
- lowering the rotor blade (200) by means of the hoisting means (400),
- fastening at least one adapter (500, 550) for holding the rotor blade (200) to the hub (100) and to the rotor blade (200) after the rotor blade (200) has been lowered, and
- disconnecting the at least one adapter (500, 550) from the rotor blade (200) and hub (100) prior to hoisting the rotor blade (200).

2. The method according to claim 1, wherein at least one of the threaded bolts screwed into the tapped hole are unscrewed and removed before the at least one threaded rod (300, 310, 320) is screwed in.

3. The method according to claim 1, wherein the plurality of threaded rods (300, 310, 320) which are each connected to a respective hoisting means (400) are each screwed into a respective tapped hole in the rotor blade flange (210).

4. The method according to claim 1, wherein the at least one adapter (500,550) is attached to the hub (100) or to the rotor blade flange (210) by a second plurality of threaded bolts (600, 650).

5. The method according to claim 1, wherein the at least one adapter (500, 550) comprises at least two adapters (500, 550) attached to the hub (100) and to the rotor blade (200).

6. The method according to claim 1, wherein a cable (700) for holding the rotor blade (200) is attached to the hub (100) and to the rotor blade (200) after the rotor blade (200) has been lowered.

7. The method according to claim 6, wherein at least one guide rail is also mounted on the hub (100) and on the rotor blade (200).

8. The method according to claim 1, wherein all the threaded rods (300, 310, 320) are unscrewed after fastening the at least one adapter (500, 550) so that the rotor blade (200) is attached suspendingly to the hub (100).

9. A method of servicing a wind turbine, in which at least one rotor blade (200) used in operation of the wind turbine is mounted on a hub (100) of the wind turbine by means of a slewing ring bearing (110) such that a pitch angle of the rotor blade is adjustable, and a movable slewing bearing part (120) is joined rotatably to the hub (100) and fixedly to a flange (210) of the rotor blade (200) by a plurality of threaded bolts, said method comprising the following steps:

- releasing the plurality of threaded bolts,
- lowering the rotor blade (200) by means of the hoisting means (400),
- turning the movable slewing bearing part (120) with respect to the rotor blade flange (210),
- fastening the rotor blade (200) to the slewing ring bearing (110, 120),
- fastening at least one adapter (500, 550) for holding the rotor blade (200) to the hub (100) and to the at least one adapter (500, 550) after the rotor blade has been lowered,
- disconnecting the at least one adapter (500, 550) from the rotor blade (200) and hub (100) prior to hoisting the rotor blade (200), and
- attaching the rotor blade (200) suspendingly to the hub (100).

10. The method according to claim 9, wherein the rotor blade (200) is attached suspendingly to the hub (100) by unscrewing the threaded rods (300, 310, 320) after attaching the at least one adapter (500, 550).

11. The method according to claim 9, wherein the movable slewing bearing part (120) is turned by at least 100°.

12. The method according to claim 9, wherein the step of attaching the rotor blade (200) comprises the following steps:

- screwing at least one threaded rod (300, 310, 320) which is connected to a hoisting means (400) into a tapped hole in the rotor blade flange (210),
- hoisting the rotor blade (200) by means of the at least one hoisting means (400),
- fastening the rotor blade (200) to the movable slewing bearing part (120) by screwing in a plurality of threaded bolts.

* * * * *